US010692125B2

(12) United States Patent
Khandelwal et al.

(10) Patent No.: US 10,692,125 B2
(45) Date of Patent: Jun. 23, 2020

(54) PRODUCT LISTING RECOGNIZER

(71) Applicant: Facebook, Inc., Menlo Park, CA (US)

(72) Inventors: Shashikant Khandelwal, Mountain View, CA (US); Gurpreetsingh Baljeetsingh Sachdev, Fremont, CA (US); Nikhil Gupta, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 564 days.

(21) Appl. No.: 15/166,869

(22) Filed: May 27, 2016

(65) Prior Publication Data
US 2017/0345075 A1    Nov. 30, 2017

(51) Int. Cl.
| G06Q 30/06 | (2012.01) |
| G06Q 50/00 | (2012.01) |
| G06N 20/00 | (2019.01) |
| G06K 9/46 | (2006.01) |
| G06N 5/02 | (2006.01) |
| G06K 9/00 | (2006.01) |

(52) U.S. Cl.
CPC ..... G06Q 30/0623 (2013.01); G06K 9/00463 (2013.01); G06K 9/469 (2013.01); G06N 5/02 (2013.01); G06N 20/00 (2019.01); G06Q 50/01 (2013.01)

(58) Field of Classification Search
CPC .................................................. G06Q 30/0623
See application file for complete search history.

(56) References Cited

U.S. PATENT DOCUMENTS

| 8,438,080 | B1 * | 5/2013 | Xiao | G06Q 30/02 |
| | | | | 705/26.1 |
| 2004/0254950 | A1 * | 12/2004 | Musgrove | G06F 17/30327 |
| 2006/0161569 | A1 * | 7/2006 | Meyer | G06F 16/90335 |
| 2007/0073758 | A1 * | 3/2007 | Perry | G06Q 30/02 |
| 2008/0115057 | A1 * | 5/2008 | Grandhi | G06F 17/211 |
| | | | | 715/272 |
| 2012/0005211 | A1 * | 1/2012 | Ayoub | G06F 17/3089 |
| | | | | 707/737 |
| 2015/0106692 | A1 * | 4/2015 | Bolchini | G06F 3/0487 |
| | | | | 715/234 |
| 2015/0127483 | A1 * | 5/2015 | Elliot | G06Q 30/0633 |
| | | | | 705/26.8 |

OTHER PUBLICATIONS

Caffarella, "Extracting and managing structured web data," 2009, Dissertation Abstracts International (Year: 2009).*

* cited by examiner

*Primary Examiner* — Brittney N Miller
*Assistant Examiner* — Anna Mae Mitros
(74) *Attorney, Agent, or Firm* — Baker Botts L.L.P.

(57) ABSTRACT

In one embodiment, a method includes extracting a document object model (DOM) for a content page, wherein the DOM comprises a hierarchical tree-based data structure. The method also includes identifying candidate nodes in the DOM based on a context of the nodes, wherein the candidate nodes may correspond to listing items. The method additionally includes for each of the candidate nodes, locating its parent and child nodes by traversing the DOM from the candidate node, extracting information from the candidate node and its parent and child nodes, and assessing whether the candidate node qualifies as a listing item based on whether the extracted information fulfills a required set of characteristics for a listing item.

18 Claims, 10 Drawing Sheets

```
                                                        ::before
701
705     <div id="fashion_371159" data-style-number="429054" class="fashion-item">
          <div class="fashion-display">...</div>
          <div id="swatchResults_371159" class="fashion-colors swatch-slider">...</div>
          <div class="info default men adult">...</div>
        </div>
710     <div id="fashion_4009796" data-style-number="1090190" class="fashion-item">
          <div class="fashion-display">...</div>
          <div class="info default men adult">...</div>
        </div>
715     <div id="fashion_4073977" data-style-number="1113979" class="fashion-item designer">
          <div class="fashion-display">...</div>
          <div id="swatchResults_4073977" class="fashion-colors swatch-slider">...</div>
          <div class="info default men adult">...</div>
        </div>
720     <div id="fashion_3969023" data-style-number="1056298" class="fashion-item last">
          <div class="fashion-display">...</div>
          <div id="swatchResults_3969023" class="fashion-colors swatch-slider">...</div>
          <div class="info default men adult">...</div>
        </div>
        ::after
        /div>
725     div data-photos-loaded="true" class="row clearfix standard-row">...</div>
        div data-photos-loaded="true" class="row clearfix standard-row">...</div>
        div data-photos-loaded="true" class="row clearfix standard-row">...</div>
```

*FIG. 7*

PRODUCT LISTING RECOGNIZER

TECHNICAL FIELD

This disclosure generally relates to recognizing product listings.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In certain embodiments, a document object model (DOM) is extracted for a content page, such as a web page (e.g., written in HTML or another unstructured markup language) displaying a product catalog associated with an electronic commerce (e-commerce) entity. The DOM is a hierarchical tree-based data structure that represents each element of the content page as a "node." Candidate nodes in the DOM are identified based on a context of the nodes. For example, the context of the nodes includes various elements and attributes of the DOM, but in some instances includes a type of node and other current or nearby node attributes. In certain embodiments, the candidate nodes correspond to potential product listings, such as product listings offered for sale by the e-commerce entity. Each candidate node and other related nodes in the DOM are processed to determine whether the candidate node qualifies as a product listing based on whether extracted information fulfills a required set of characteristics for a product listing.

In certain embodiments, e-commerce entities are identified and associated webpages are crawled to identify product listing pages and product listings within those pages. A DOM is extracted from each webpage and candidate nodes (e.g., candidates for potential product listings) in the DOM are identified based on a context of the nodes. For example, image nodes may be flagged as candidate nodes. In certain embodiments, "candidate node" refers to a potential indication of a product listing within a DOM. Additional nodes may be flagged as candidate nodes based on a context of the node, such as its relationship to other potential indicators of a product listing. In certain embodiments, one or more parent and/or child nodes are located for each candidate node by traversing the DOM from the candidate node. Parent nodes may also be identified with reference to a context of the parent and/or child. DOM elements encompassed in the traversal of DOM elements between the candidate and each potential parent and/or child may also be analyzed to determine a parent/child relationship between DOM elements. In certain embodiments, information is extracted from the candidate node and its parent and child nodes. This information can be used to assess whether the candidate node indeed qualifies as a product listing based on whether the extracted information fulfills a required set of characteristics for a product listing.

In certain embodiments, a product catalog, such as a catalog available by subscription (e.g., CNET), is analyzed for product listings. An object representation of the catalog is constructed such that nodes in the catalog are represented as objects in a hierarchical tree-based data structure. In certain embodiments, the representation resembles a DOM, such as a DOM of a webpage; however, in this case no connection to a web page need be present to generate such a representation. In certain embodiments, candidate nodes are filtered based on adherence to a set of predetermined characteristics for product listings. For example, product listings may each have a nested "buy" button or link embedded within its hierarchical tree structure. As another example, products listings may each have an image having certain proportions that feature a specific item or items. In certain embodiment, image recognition software is used to determine product images for use in identifying candidate nodes and/or product listings. In certain embodiments, this process continues until a sample set of training data is available with positively identified product listings for a certain vendor. The sample data can be used to train a machine learning algorithm to automatically identify product listings and extract relevant information from identified relevant pages.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 7 illustrates a portion of an example source markup for an unstructured document hosting item listings.

DESCRIPTION OF EXAMPLE EMBODIMENTS

Figure 1:
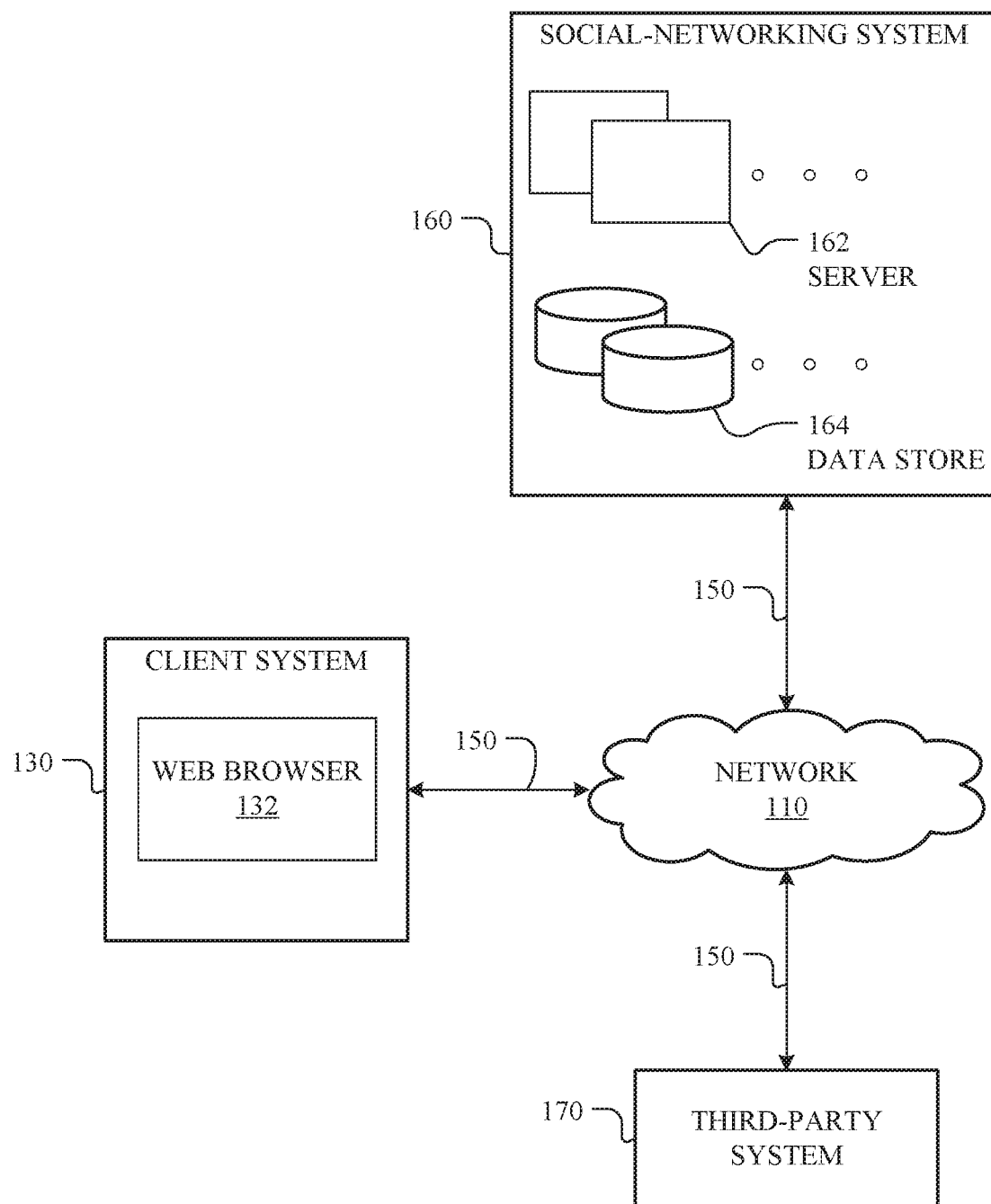
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate. More information on webpages may be found in U.S. patent application Ser. No. 11/856,202, filed 17 Sep. 2007, which is incorporated by reference.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
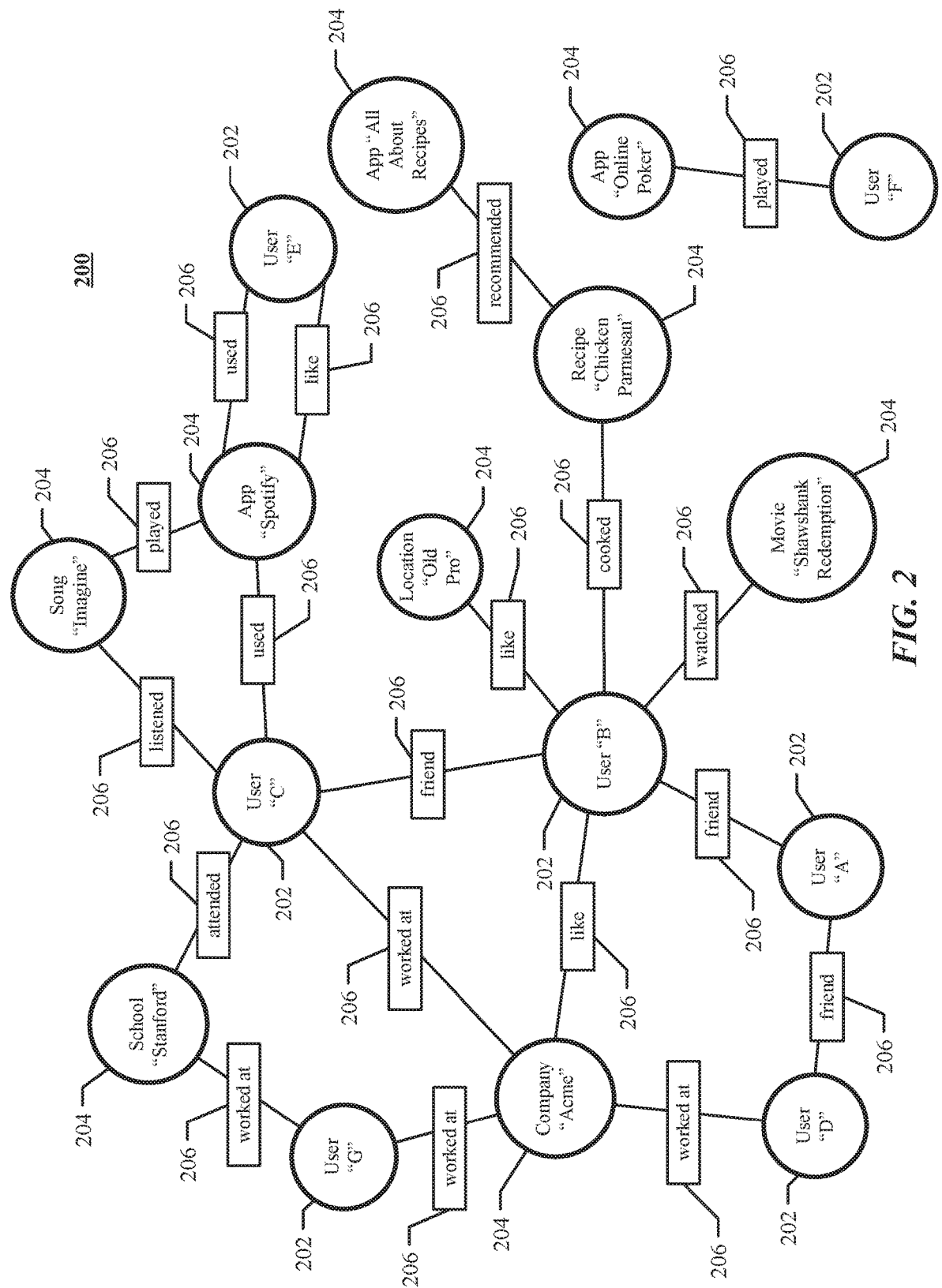
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPO-TIFY").

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The popularity of e-commerce websites has fueled a rapid expansion of the number of products, services, experiences, and the like (collectively referred to herein for convenience as "products" or "items") offered for sale online. Low overhead costs and a wide array of available shipping options allow e-retailers to offer the same products that are sold in brick and mortar stores often for lower prices and with a larger selection of alternative items. Traditional brick and mortar franchises often list their products or items for sale online too, bringing their own market advantages to bear, such as by offering same day in-store pickup or delivery or lower prices provided by supply chain advantages of high-volume retailers. Today, nearly every product sold in the developed world is available online through numerous sellers. Often, services, products, and the like can be reviewed online via a review website. For example, a particular review website allows patients to review doctors that they've visited. Similarly, trips, experiences, goods, and services can be reviewed by other users, and these reviews can be shared online via review listings. As another example, a particular user can review his/her experience at a museum using a similar mechanism.

Usually, an item is made available for sale online via a "listing item" on a webpage. The listing item contains information regarding the item such as, for example, the seller of a product, the location of retail chains of the seller that may carry the product, a mechanism for a user to purchase the product over the internet (e.g., a "buy it now" or "add to cart" button), a mechanism to book a reservation at a restaurant or a hotel, and the like. In some cases, the same item may be listed on numerous (e.g., hundreds or thousands) of e-commerce websites via different listings that contain similar listing attributes. Often, these listings are not standardized across retailers. Some websites sell items with different available options, such as different sizes or colors, and may include purchase incentives, such as free shipping or other special features. As another example, a "suite" at a particular hotel may be offered with a king bed or two double beds. While both rooms are "suites" they each provide a different options or features. Similarly, reviews are hosted online in an item listing corresponding to a particular review or set of reviews However, this information is often difficult to aggregate between listings provided by various retailers.

While the particulars of listing item conventions vary between vendors, listing items are usually presented on content pages that share one or more identifiable or common attributes across vendors. For example, a typical e-commerce website may contain the following types of pages: item detail pages, non-item pages, multiple item listing pages (e.g., listing items by category or listing items responsive to a user search), and other generic web pages (e.g., home, about, blog articles, and the like). It may be useful to distinguish between each type of page in order to analyze the data contained therein. For example, when extracting information regarding item listings, item detail pages are useful because they present a large amount of relevant information regarding each item. As another example, item listing pages are useful for iterating through all items available on a particular webpage. The terms product listing, item listing, service listing, review listing, and any other type of identifiable listing are referenced interchangeably in the context of the present disclosure. For example, those of ordinary skill in the art will appreciate that the term product listing can refer to hotels, restaurant reservations, or other experiences. Similarly the same terminology may refer to review listings without departing from the scope of the present disclosure.

However, pages of an e-commerce website are often difficult to classify or identify since considerable processing of content pages is required to extract enough useful information to make a determination as to the type of page presented. For example, item detail pages are often laid out in a non-uniform layout as between different websites. Different websites may nest item listings within varying layers of nested HTML, elements, such as multiple layers of "div" elements used in positioning item content and rendering other visual content items. Various other heterogeneous configurations for providing item listing information can be imagined. Accordingly, algorithms designed to extract item information from such listings should be adaptable to extract relevant information from any of a number of item listing formats. These algorithms may also be used to extract details regarding each item for clustering and normalization so that the extracted information can be used to improve user experience. For example, organizations often desire to use item information from different e-commerce sellers to benefit their customers. Sometimes a company providing a free service to a user, such as a social-networking service, may attempt to advertise particular items that correspond to identified interests of their users in order to continue providing that service free of charge. In some cases, this information can even be used to improve the provided service or to provide additional services to meet or surpass user expectations. The organization may receive resources from the e-commerce site in exchange for displaying an advertisement or contributing to a sale of the advertised item. This symbiotic relationship may allow the organization to pay for other resources, such as servers and employees, without charging its users. However, once item information has been extracted, an accurate and reliable mechanism for organizing that item information is required in order to productively use it.

In certain embodiments, a product listing aggregation service "crawls" content pages associated with e-commerce retailers to extract product information. "Crawling" may refer to iteration over and discovery of content pages. For example, a web crawler may crawl web sites associated with a specific keyword. As another example, a crawler crawls a list of web domains. The crawler loads content associated with each identified page. In certain embodiments, content pages are classified based on identified attributes. The classifications can be used to formulate an algorithm tailored to crawling the particular site. For example, the algorithm may provide a smarter or more efficient means to iterate through each product listing, as opposed to other methods of product listing iteration such as, for example, brute force page iteration. Proper identification of product listing pages and product detail pages, as well as other pages, is critical to tailoring a crawling algorithm to a particular purpose.

Figure 4:
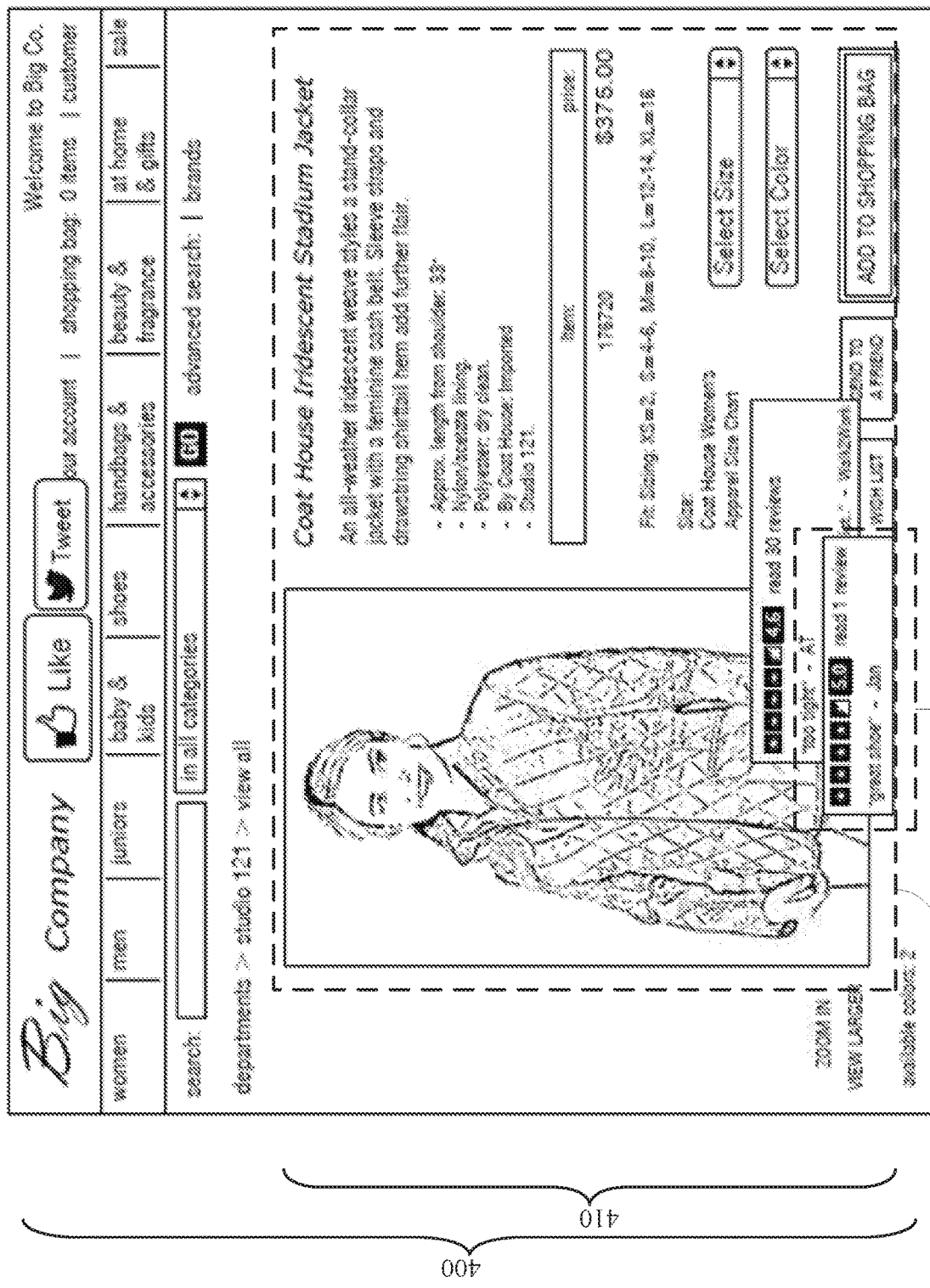
FIG. 4 illustrates an example product details page.

In certain embodiments, e-commerce retailers are identified and content pages are crawled or processed to extract product listing information. For example, Big Corp., a fictional department store chain having numerous franchises (e.g., brick and mortar stores) throughout the country, lists products online through its website www.bigcorp.com in addition to selling products in its retail stores. Big Corp. lists products from various vendors in different departments or sections within its stores and on its website. The website contains a considerable amount of information regarding each listed products. The following product information is associated with each product listing: title, product reference number, manufacturer, color, size, model, product image(s), alternative product views, availability (e.g., units available in Big Corp.'s warehouse and/or at its franchise locations), price, description, special offers, product features, noun, manufacturer's product number (MPN), universal product code (UPC), dimensions, and the like. For example, a robust view of available product information is illustrated with reference to product panel 410 in product page 400 of FIG. 4. Notably, the structure of Big Corp.'s item listing website may differ dramatically from the structure of a competitor's item listing website. For example, Small Corp. may use completely different containers to host images of their items and may include far fewer and different product attributes via its website. Big Corp. may also release a product catalog in a human readable, machine readable, or any other format. For example, Big. Corp. distributes a structure document that lists each of its products, available options, and list price. The catalog contains some and/or all of the product listing information available on Big. Corp.'s website for each listed product.

In certain embodiments, an e-commerce company's website structure is analyzed to optimize product listing information retrieval operations. Website structure includes the layout of the site, organization of pages, architecture of the site, and the like. For example, Big Corp.'s website layout may be represented by a site map that provides a hierarchical mapping of content pages to other related content pages. A site map can be useful for navigating through pages of related content, such as product listing pages. In certain embodiments, a crawling process constructs a site map for a given set of web pages based on determined page types of particular pages. While analyzing the structure of a given website, features of each content page are analyzed to identify elements, and the page is categorized as a particular "type" of page (e.g., product listing page, product detail page, home page, about page, and the like). For example, if a number of product listings are identified on a page, the page is classified as a product listing page.

In certain embodiments, a crawling process converts particular pages identified during a crawl into a hierarchical tree-based data structure that contains information regarding content elements associated with the page. The content elements are analyzed to identify product listings, reviews, and other identifiable product information. Identified elements are used to categorize pages. For example, www.bigcorp.com is structured so that product listings are accessible in multiple views. A home page of bigcorp.com may list several featured items in a feature products content panel. Additional pages of the bigcorp.com website showcase product listings using other content panels that are optimized for a particular purpose. For instance, the goal of the home page may be to draw in new users by showing users available products that they may be interested in or that they may not know are carried by the provider. Thus, the product listings on the home page may be optimized for that goal, such as by enlarging the picture, or by showcasing particular aspects of the product, instead of providing the most comprehensive view of the product (i.e., a complete listing of product information). Accordingly, while home pages are useful for attracting users, product listing algorithms or crawlers are better suited for examining other types of pages for product listing content. Thus, the product listing recognizer may categorize the home page as a non-product listing page (e.g., using any useful naming convention), and may move on to inspect additional pages, either by following links from featured products or using other interactive interface elements. In certain embodiments, webpage uniform resource locators (URL's) or identifiers (URI's) can be modified directly to retrieve additional relevant content pages. With reference to Small Corp. from the above example, the analysis process may be similar but yield different results for each website. For example, since the structure of the Small Corp. website is dramatically different than the structure of Big Corp.'s site the process adapts to the different structure of each website to extract the proper or desired information. For example, if item listings are in a left side column on Big Corp.'s website and in a right side column on Small Corp.'s website, the process described herein is applied from the top level of the structured document down to ensure that the proper elements are found on each site, despite the sites having heterogeneous structures.

As another example, the crawling algorithm retrieves another content page associated with Big Corp. This page contains information regarding various product listings. For example, with reference to FIG. 5, an example web page 500 associated with Big Corp. is illustrated in accordance with a non-limiting embodiment of the present disclosure. Web page 500 displays a content panel 510 containing a row of product listings 512A-D and navigation panel 520. Each product listing 512A-D is represented by an image, a model name, a manufacturer, brief description, price, and color options. In this example, each product listing provides a high level overview of a men's jacket product. In certain embodiments, a web crawling process receives, for example, html instructions for building this webpage. A DOM is constructed to analyze page elements. In certain embodiments, the crawling process is provided with a more generalized URL that is manipulated to retrieve the listing of men's jackets shown in FIG. 5.

Figure 5:
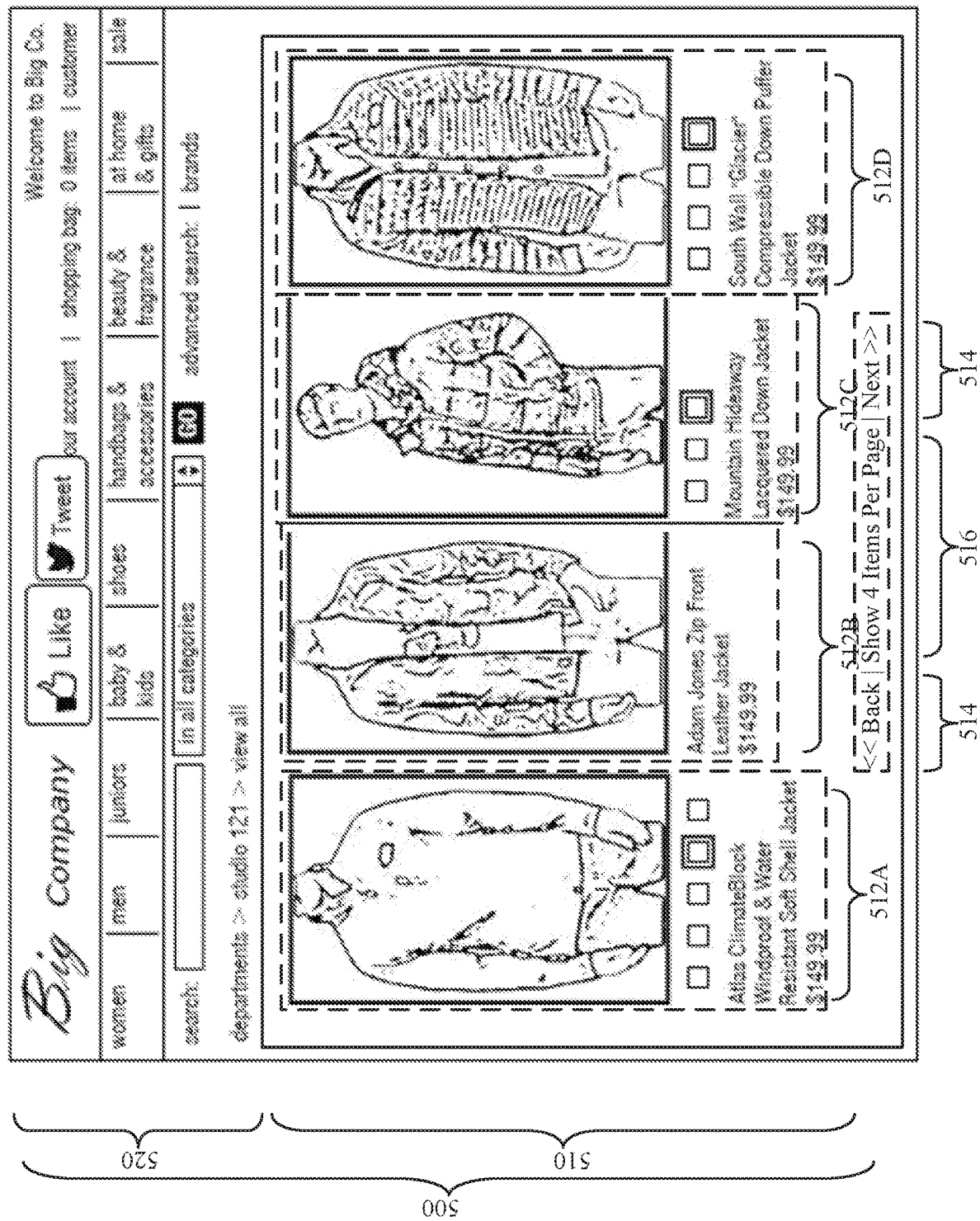
FIG. 5 illustrates an example product listing page featuring product listings.

With reference to content panel 510 shown in FIG. 5, four product listings 512A-D are listed in a first row. In certain embodiments, page 500 includes additional rows of product listings. The additional listings may be related to the other product listings. Page 500 also includes navigation button links 514 (i.e., "Back" and/or "Next" buttons or links), and a combo box 516 for selecting the number of items listed on each page. Presently, only 4 products are listed on each page; however, combo box 516 may have interactive functionality that allows an end user to select the desired number of product listings to display per page. By way of explanation, client devices connected via low bandwidth connections may load pages with less content faster than pages with large amounts of content. On certain pages, a left side column contains product attributes used for filtering product listings. With reference to webpage 500, a breadcrumb trail in navigation panel 520 shows product attribute tags leading to the current listing of products. Certain web pages may have a product attribute filtering section that allows users to select particular product attributes for narrowing and/or expanding the list of displayed products.

In certain embodiments, a product listing recognition process identifies each of these elements to assess whether the current page is a product listing page or some other type of page. In this example, the process generates a DOM representation of the webpage and identifies candidate nodes that are potentially associated with product listings. For example, each image in 512A-D in the above described page is flagged as a candidate node. The DOM structure is traversed (e.g., up and/or down the hierarchy from each flagged candidate node) and the context of each node is analyzed. The candidate flag is confirmed or denied based on additional information gathered during the DOM traversal process that tends to include or exclude the candidate node as a product listing. The page is flagged as a product listing page based on whether the identified attributes are similar to a set of defined characteristics that define a product listing page. In certain embodiments, the characteristics include identifying more than one product listing, navigation button, listing the criteria, and the like. In certain embodiments, other page types are classified based on whether page attributes are similar to a set of defined characteristics that define any type of page, such as an item details page, an about page, a home page, and the like.

In certain embodiments, information extraction is optimized based on the type of page. For example, as described above, a product listing recognizer is used to crawl pages, identify item listings, and classify pages based on defined page type characteristics. An information extraction process that is optimized for extracting information from each type of page is selected based on the current page type. For example, the information extraction process selected for extracting item listing information from an item listing page is different from the information extraction process selected for extracting information from an item details page. The former may be more adept at retrieving information for a large number of different items, while the latter is optimized to extract item listings information regarding related items.

With reference to FIG. 5, markup language text (e.g., HTML) representing webpage 500 is processed to generate an object model. Each element, such as product panels 512A-D, Next and Back buttons 514, combo box 516, product images, item descriptions, color selections, and each other element represented on page 500 is processed to create a hierarchical tree-based data structure. Each element is represented in the data structure as an object and each attribute of the element is represented as an attribute of that object. For example, content panel 510 contains sub-elements of product listings 512A-D. Each product listing 512A-D is hosted in its own panel (e.g., denoted by a "<DIV>" tag) that is represented in the data structure, and each sub-element of product listing 512A-D (e.g., image, description, title, model, color, etc.) is also represented in the data structure. Attributes of each element are represented as object or node attributes in the data structure. For example, the size and position of the content panel for each product listing 512A-D is specified as attributes in the data structure. In certain embodiments, the data structure is relational. For example, the data structure includes a hierarchy of object elements. Each element may have sub-elements. A root page element contains all other content within page 500.

Figure 3:
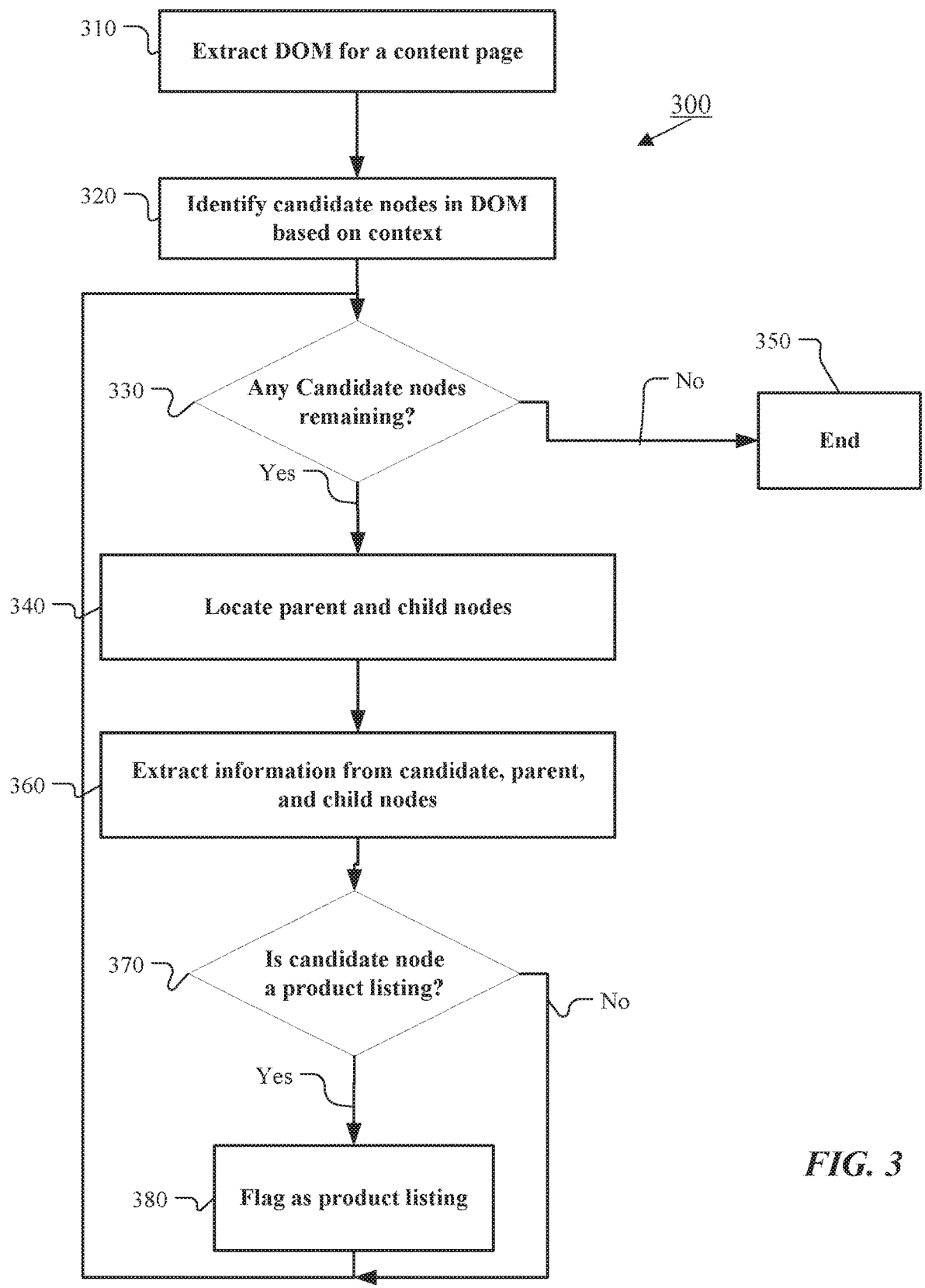
FIG. 3 illustrates an example flow chart of a method for recognizing product listings.

With reference to FIG. 3, a process for extracting information from a content page to identify product listing pages is illustrated in accordance with a non-limiting embodiment of the present disclosure. At step 310, a content page is identified and a data structure representing content elements in the page as nodes in a hierarchy is extracted for the content page. For example and as described above, a web crawler crawls a set of identified web pages with the purpose of classifying pages and extracting page content for cataloging and use in a product comparison application or some other type of application. The web crawler retrieves content pages, such as page 500 from FIG. 5, and constructs a hierarchical tree-based data structure, or DOM, for the content page. For example, each content element is represented as an object in the DOM. DOM elements can be easily traversed during processing and analyzed for associated attributes and context from related elements within the model.

At step 320, candidate nodes in the constructed DOM are identified based on DOM element context. DOM element context can include one or more of associated elements, attributes, functionality, appearance, and the like. For example, the size of product listings 512A-D can be analyzed to determine that 4 content panels of relative size are displayed in a row in the center of content panel 510 on page 500. This "context" can provide useful clues for identifying product listings within a page. As another example, product images within product listings 512A-D are analyzed based on size, positioning, and/or image appearance. Image recognition software can be used to identify a similar product (e.g., a jacket) in each product listing 512A-D image. As another example, product listings 512A-D can be identified using context from element relationships. For example, parent content panel hosts 4 relatively uniform content panels. Each content panel containing an image within parent content panel 512A-D is flagged as a potential "candidate" node, object, or element. In certain embodiments, name attributes are examined to determine candidate nodes. For example, if DOM object content panel 510 is titled "product panel," the process can identify candidate nodes within the panel as potential product listings based on the name attribute context. Those of ordinary skill in the art will appreciate the wide variety of DOM objects and attributes that may serve as "context" for indicating the presence of candidate nodes that are potentially associated with product listings.

As yet another example, Next and Back buttons 514 are identified while iterating through the DOM. The mere presence of these buttons may indicate the content page is a product listing page. Moreover, links associated with these elements may be useful in crawling for additional product listings. As an additional example, the presence of combo box 516 indicates that page 500 is a product listing page.

Combo box 516 may also be referenced when optimizing the iteration of products in order to efficiently retrieve a large number of products to minimize page crawling. For example, loading additional pages may be time consuming. A web crawler may prefer to load all products in a single content page for rapid iteration and cataloging. Navigation panel 520 may present additional context information for determining candidate nodes. Any other element of a web page may present context information that is useful in locating candidate nodes.

Figure 6:
FIG. 6 illustrates an example webpage that is not associated with any product listings.

At step 330, candidate nodes are iterated through to validate candidates as verified product listings. For example, some websites host advertisement content regions or "related products" content sections that may resemble product listings but, in fact, are secondary in purpose to the primary listed product on a product detail page. For example, one men's jacket product detail page lists suggestions for related products such as hats, scarves, and gloves (i.e., secondary products) that someone interested in purchasing the jacket (i.e., the primary product) may also be interested in purchasing. For example, a "suggested" or "related" product section may be provided on product detail page 400 in FIG. 4, such as below product detail listing panel 410. Advertisements for additional related products are also frequently found on such pages and others. As another example, some content pages associated with an e-commerce retailer may appear to be a product listing page and may appear to host one or more candidate nodes, but may not be a product listing page. For example, FIG. 6 shows an "About" or "Wiki" page displaying information about Big Corp. FIG. 6 includes an image that may appear to be associated with a product listing or a product detail page. In this example, the size dimensions and positioning of the image of Big Corp.'s corporate headquarters may match context identifiers associated with product listings or product details pages. Further, "About Us" content may match context criteria for being product details associated with a product listing. However, FIG. 6 does not include any product listings and should not be flagged as a product listing page. At step 330, candidate nodes that are flagged in error based on misleading context in the constructed DOM are vetted with reference to criteria for identifying true product listings. Candidate nodes are iterated through until none are remaining and the page can properly be classified as, for example, a product listing page, a product details page, a home page, an about page, or the like, at step 350.

If one or more candidate nodes are remaining, the process continues on to step 340. At step 340, parent and child nodes are located. Parent and child nodes can be located with reference to a data structure or DOM by traversing the structure. For example, in a hierarchical data structure, such as a DOM, parent nodes can be found by traversing the data structure up the hierarchical listing of elements. Similarly, child elements can be found by traversing the data structure down the hierarchical listing of elements.

With reference to FIG. 5, process 300 flags each image of a men's jacket in content panel 510 as a candidate node, for example, for one or more of the reasons described above with reference to step 320. At step 340, process 300 traverses the DOM up from each candidate image node until a common parent element is found. In this example, content panel 510 is determined to be the lowest parent element having each candidate node as a child. Accordingly, content panel 510 is flagged as the parent of each child image node. In this example, parent node 510 is a content panel. However, any other type of element can host any number of product listing candidate nodes.

In certain embodiments, related candidate nodes are identified and linked together for proper identification of parent elements. For example, if webpage 500 included an advertisement section or a related products section that also contained candidate nodes (in this example, candidate nodes associated with the advertisement or related products have been flagged as candidate product listings in error), process 300 determines two sets of product listing candidates. In other words, process 300 determines that two different sets of potential product listings are displayed on a single page. The two different sets are determined to be associated with each other via context information. As another example, several rows of candidate listings are associated with each other. While row 510 of candidate listings is displayed in a single content panel, several other sets of candidate listings are also displayed in rows. In this example, the different sets of candidate listings are associated with each other because they are all displayed in a parent content panel. In this instance, the parent content panel is a vertically scrollable content panel that scrolls through rows of product listings. Different context information is available to identify this parent item as opposed to other examples with sets of unrelated candidate nodes.

Child nodes are discovered by traversing down through the hierarchy from the parent item. Child nodes may include content elements associated with various product listing attributes. Accordingly, child nodes provide valuable information in identifying a candidate node as a product listing. For example, process 300 traverses through label elements that identify aspects of a product listing, such as product title, MPN, UPC, and the like. Once these elements are encountered below a parent element in the hierarchical data structure, process 300 flags the candidate as a product listing. As another example, elements that do not appear to provide product information, such as a long text box containing multiple paragraphs of non-product content, may expedite identification of the candidate node as a non-product listing node.

At step 360, information is extracted from the identified candidate parent and child nodes. For example, and in accordance with the process described above, context information is extracted from each identified node such as node attributes, values, and positioning information. Context information may also include other information regarding surrounding nodes or other more distant nodes. For example, if a node is nested within several layers of divs under a higher level node named "products," "items," or "listings," this information may also be collected along with the number of candidate parent or child nodes nested within such a node. As another example, other attributes of higher or lower level nodes may be extracted to give context to the identified parent or child node.

At step 370, process 300 determines whether the current candidate node is associated with a product listing based on information collected during the candidate node identification stage, parent and child node identification stages, and information extraction stage. If the candidate node is associated with a product listing, then the candidate node is flagged as a listing item in step 380. In certain embodiments, process 300 can also use other context information, such as the identification of a breadcrumb of product attributes, such as a listing of product attributes used in a product listing filtering operation. As another example, other context information, such as the identification of Back and Next buttons, is used to determine whether candidate nodes are associated with a product listing. For example, if following the back and next button links provides different candidate nodes in the same relative position, the candidate nodes can be identified as product listings.

In certain embodiments, a product listing is recognized on an e-commerce website. The product listing is processed to identify additional product listings and each identified product listing page is "crawled" to find other product listings. The product listings for the website can then be modeled. The process is repeated on additional e-commerce websites to create a data structure or model that can be searched and can help identify related products. In certain embodiments, the model can be used to help catalog additional product listings. Products can be classified and compared using, for example, title or image recognition.

In certain embodiments, product listings are recognized on a webpage and extracted using an algorithm. The algorithm involves extracting the HTML DOM of an e-commerce webpage, and traversing it to find patterns indicative of relevant content such as product listings. CSS stylesheets can be downloaded and applied to the HTML elements and Javascript can be disabled in order to simplify crawling and product identification. Image links are downloaded and analyzed for relevancy using, for example, image recognition techniques and comparison processes.

In certain embodiments, a "pivot" item that likely represents a product listing is identified within the extracted DOM. A pivot item may correspond to a candidate node. Generally, a product will be represented by at least an image having particular attributes. Accordingly, such image elements are located and selected as pivots. The algorithm uses additional clues embedded in the DOM structure or linked content, such as style sheet classes or GUI elements, in order to help identify such pivot items. Lists of parent and child elements are determined. For example, parent elements are located by traversing the DOM up from a pivot element until a single element with multiple nested pivot items is located. Often, this will require traversing the DOM up several elements since the pivot may be nested within several HTML elements, such as <DIV> elements or other elements, that contain positioning information and text describing the product or other product listing information. For example, a parent element may include several rows of pivot items nested within it, such as in a traditional product search page. Child elements are the highest order elements within the parent element that include only one pivot element.

With reference to FIG. 7, a portion of an example markup document 700 (lines 701-726) is illustrated. The markup document 700 is associated with a content page that provides item listings. This particular page 700 displays the four men's jacket listings, for example, as illustrated in FIG. 5. In certain embodiments, a DOM is constructed from such a markup document. Each element, and each attribute of each element, is represented in the DOM. For example, the "DIV" element beginning on line 703 is represented in the DOM, along with its sub-elements, which in this case are also "DIVS." Attributes, such as the "class" attribute of the "DIV" element shown in line 703 are also represented in the DOM. In certain embodiments, class attribute values can provide a clue that certain elements are associated with each other, since common CSS style elements are frequently applied to associated elements to provide a uniform look. In certain embodiments, a pivot item is located. In this example, the pivot item may be an image nested under a "DIV" item, such as the "DIV" item in line 704. In this example, several pivot items are found, i.e., in lines 704, 709, 713, and 718. The DOM is traversed upwards from each pivot item until the first element that has multiple pivot items is located. In this case, the "DIV" in line 701 is located as such an element. This element is marked as a parent node. Continuing on with this example, the DOM is traversed downward to gather "child" nodes that are associated with each pivot. For example, similar containers elements can be identified and associated with a pivot item. In this instance, the elements in lines 703-707; 708-711; 712-716; and 717-721 are each determined to be candidate nodes. A pattern is detected between the candidate nodes. For example, the pattern of item image with a color swatch slider below is identified in this particular listing of products. However, some items may not have multiple colors available. The process may adapt to these scenarios to find patterns even though the candidate nodes may not be identical. For example, the candidate node in lines 708-711 does not have a color swatch selection, but still fits the pattern of items. In certain embodiments, the process may determine, based on the identified candidate nodes that page 700 corresponds to an item listing page based on the characteristics of the identified listing items.

Once pivots, parents, and children are determined, the children are analyzed for particular content items. Some may be removed based on the analyses. For example, children are inspected for prices, "buy links," or other attributes that are indicative of a product listing. In certain embodiments, a "buy link" refers to a user interface element or collection of elements in a DOM that provide a user with a mechanism to purchase a listed product. For example, a buy link may consist of a button control that redirects the page to a payment processing page where the product can be purchased. As another example, the buy link includes client side processing that generates a message to add a particular product to a shopping cart. The shopping cart element (e.g., a widget) can be updated to include the added item. Those of ordinary skill in the art will appreciate the wide variety of content page, web page, or structured document nodes that may be associated with a buy link in the context of e-commerce product pages and listings.

Child items may be found in, for example, a "related products" section or advertising section of an e-commerce web page. For example, a product page displaying jackets may also include a "related products" section that includes related accessories, such as scarves and hats. However, these listings may be links to additional listing pages. Accordingly, while these listings are not useful for immediately extracting product information from the current page, such links can be used to normalize URL's to crawl the web page for additional products.

In certain embodiments, other child items that are determined to contain product listing information are clustered. Child nodes that are outliers can be filtered out from the clusters. Outliers may include child nodes that vary in terms of size or configuration from the rest of the product listings. This may, in some instances, indicate that the outlier child node does not contain product listing information. For example, advertising content may be selected as pivot and child items within a parent element. Cluster filtering can be employed to weed out these non-conforming product listings from the site's product listings.

In certain embodiment, an algorithm can be trained for a particular web site based on product listings on that site. This may occur in a generalization step. This includes determining criteria for quickly determining pivot, parent, and child items, as well as criteria for filtering irrelevant pivot items. For example, the algorithm may be run on a variety of e-commerce websites. However, the algorithm can be trained for each particular website in a different manner, such as in order to locate particular pivot items or product groupings. The extracted product listings are then added to a structure or model that includes information regarding listings on numerous web sites. Updates to each product listing can be periodically gathered and pushed to the structure. The structure can be used in a search engine to locate relevant products as described below.

In certain embodiments, product review information is also extracted from a product listing page and included in the structure to provide more information regarding each particular product. For example, dates may be selected as pivot items, since they are commonly associated with reviews. A content element that includes rating information or some other special keywords can be used to verify parent and child nodes after locating pivot items in the HTML, page. For example, a product listing has 5 reviews presented below it. This review information can be retrieved and stored with the product listing in the search structure. As another example, the search structure may be classified, and reviews can be associated with a product listing classification, such as a particular jacket by a particular manufacturer.

In certain embodiments, a "domain model" is generated that describes each listing item extracted from the content page. For example, the process extracts several listing items from page 400, including listing items 412 corresponding to a product listing and listing item 414 corresponding to a product review. The domain model describes the broad category of listing items at an abstract level so that a determination can be made as to what type of listing item the identified item is as well as what type of page the content page is. In certain embodiments, the domain model includes a filterable list of attributes that describe the structure and properties or attributes of corresponding DOM nodes or objects that are associated with each underlying listing item. The domain model can also be filterable based on the page type. For example, within the "shopping" or "product listing" domain, "price" may be an attribute that can be used to filter identified listing items on the page. Using the example of page 400 in FIG. 4, listing item 412 has a price attribute but listing items 414 do not. In this example, this may indicate that listing item 412 is a product listing while listing items 414 are review listings. As another example, in the "review" domain, "rating" may be an attribute that can be used to filter detected items on the page. Continuing on the with above example, listing item 412 may have not "rating" attribute, while listing items 414 each have a "rating" attribute. The presence of a "rating" attribute can be a strong indicator that the listing items 414 are review items.

Figure 8:
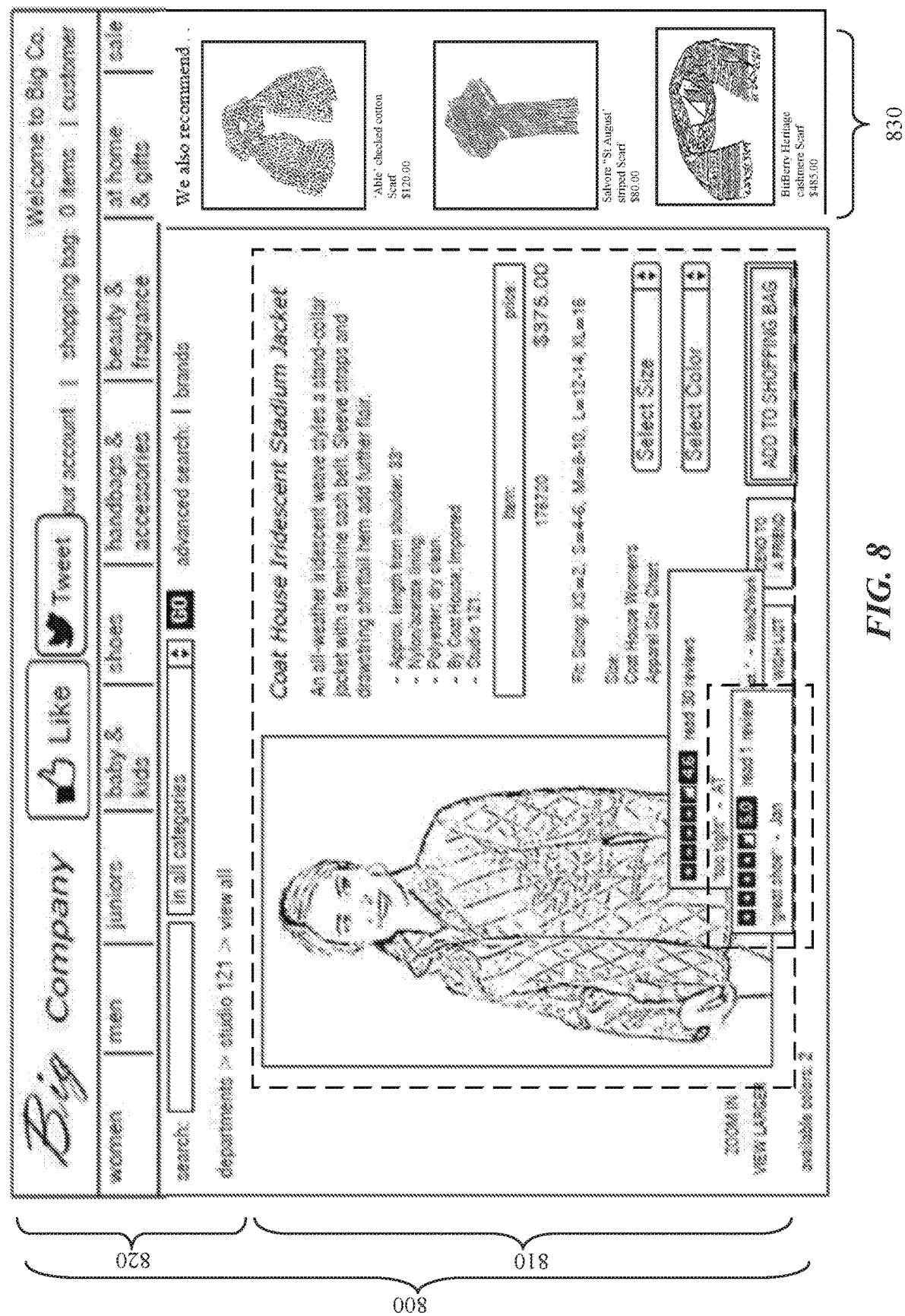
FIG. 8 illustrates an example product page with related item listings.
Figure 9:
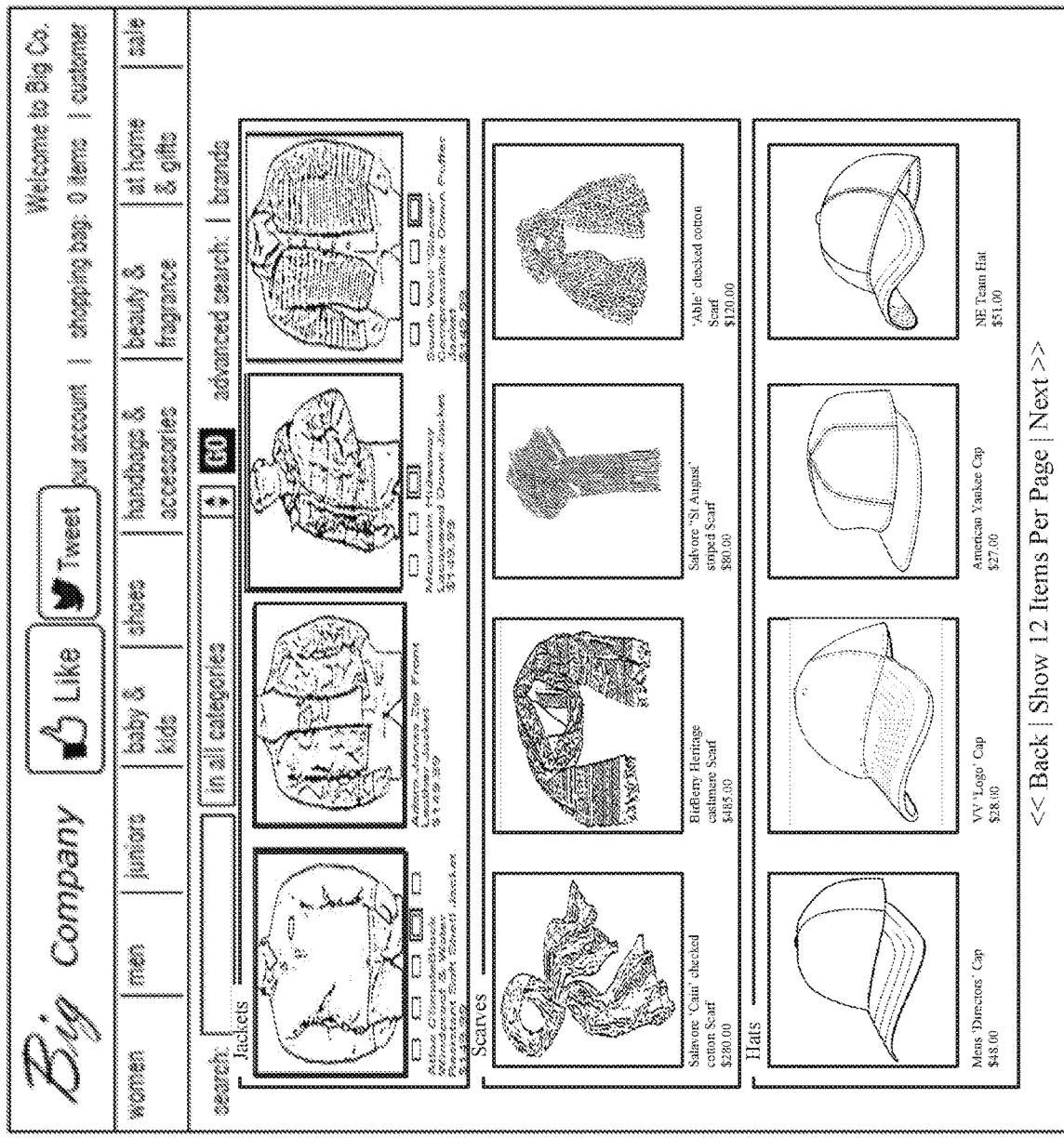
FIG. 9 illustrates an example product listing page displaying various product listing categories.

In certain embodiments, extracted information from item listing pages can be used to provide recommendations to users. For example, if a particular item appears in a "related items" section of an item details or an item listing page, the item may be recommended to the user via a different platform. For example, a social-networking system may provide recommendations to users based on items that users are interested in and related items that are related to those items as identified on other item pages associated with the item that the user is interested in. For example, a user "likes" a particular product via a social-networking page for that product. The information extraction and item crawling processes described herein may identify products that are related to that product on web pages that the user may have never visited. For example, with reference to FIG. 8, section 830 of webpage 800 contains a column of recommended items that are related to the primary product identified in section 810. These related products can be provided for display to the user in a recommendations section based on the user's association with (i.e., "liking" or becoming a "fan" of using the buttons in section 820 of webpage 800) the underlying product. With reference to FIG. 9, rows of product listings for products associated with different groupings are illustrated in an example webpage 900. For example, row 910 lists scarves, row 920 lists hats, and row 930 lists jackets. In certain embodiments, listing categories can be identified and used to classify items and/or pages.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044, 506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 10:
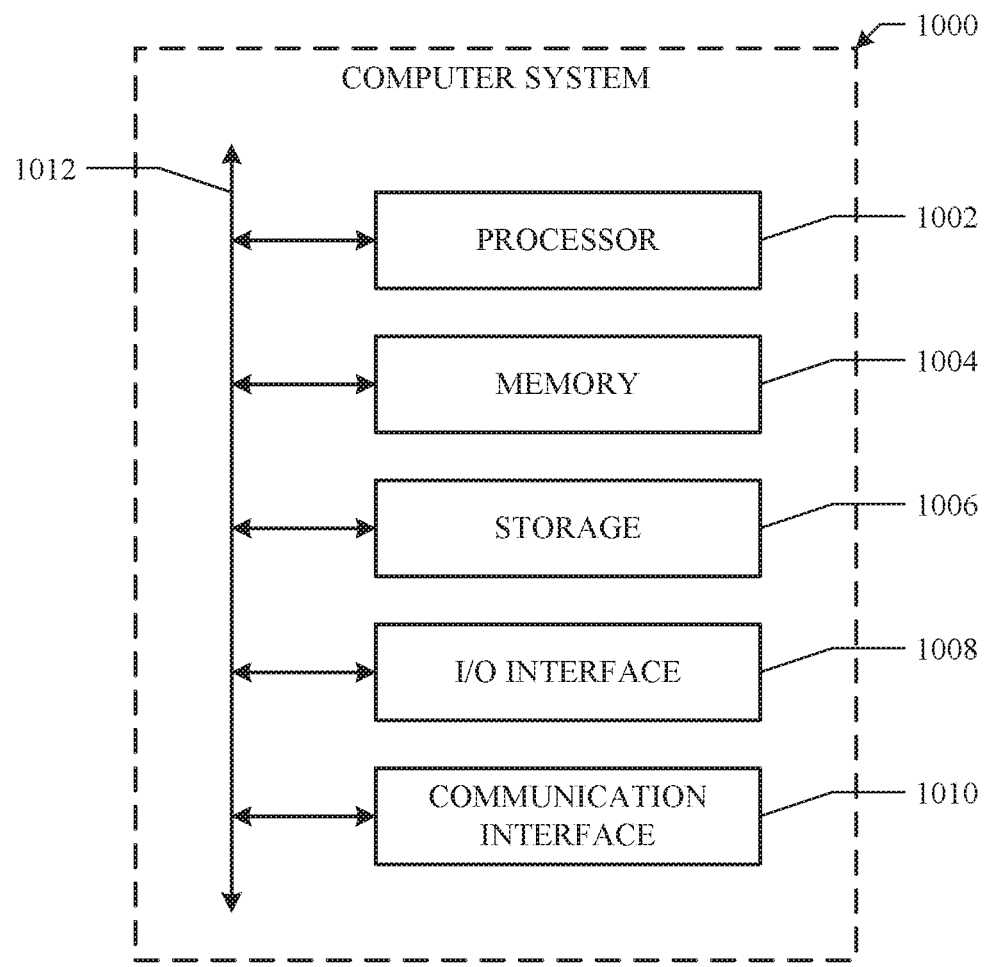
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004.

Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by one or more processors, extracting a document object model (DOM) for a content page, wherein the DOM comprises a hierarchical tree-based data structure;
by the one or more processors, identifying candidate nodes in the DOM based on a context of the identified candidate nodes, wherein the context includes identified candidate navigation elements, and wherein the identified candidate nodes may correspond to listing items;
by the one or more processors, determining whether following a URL associated with at least one of the identified candidate navigation elements results in display of different candidate nodes in a same relative position as the identified candidate nodes; and
by the one or more processors, for each of the identified candidate nodes:
locating its parent and child nodes by traversing the DOM from the identified candidate node;
extracting information from the identified candidate node and its parent and child nodes, wherein the extracted information comprises attributes extracted from a cascading style sheets (css) style class referenced by the identified candidate nodes;
determining whether the identified candidate node is a pivot item based on attributes extracted from the css style class that fulfill a set of characteristics for a listing item;
traversing up the DOM from the pivot item to determine whether a parent element is present in the DOM, wherein the parent element is a first parent node identified in the traversal with more than one nested pivot item; and
assessing whether the identified candidate node qualifies as a listing item based on whether (1) the identified candidate node is a pivot item; (2) the parent element is present in the DOM and (3) following the URL results in display of different candidate nodes in the same relative position as the identified candidate nodes.

2. The method of claim 1, wherein identifying candidate nodes comprises identifying image elements in the DOM.

3. The method of claim 1, wherein assessing whether the identified candidate node qualifies as a listing item comprises determining whether a child node for the identified candidate node comprises a nested price element.

4. The method of claim 1, wherein assessing whether the identified candidate node qualifies as a listing item comprises determining whether a child node for the identified candidate node comprises a nested buy link element.

5. The method of claim 1, further comprising:
identifying date elements in the DOM;
for each date element:
locating its parent and child nodes by traversing the DOM from the date element;
extracting information from its parent and child nodes; and
assessing whether the date element qualifies as a product review based on whether the information extracted from its parent and child nodes fulfils a required set of characteristics for a product review.

6. The method of claim 1, wherein the required set of characteristics comprises an average node size of listing items for the content page.

7. The method of claim 1, wherein each parent node is identified by determining a respective lowest node in the hierarchical tree-based data structure that contains a plurality of candidate nodes inside of it.

8. The method of claim 1, wherein each child node is identified by determining a respective highest node in the hierarchical tree-based data structure that:
is nested within one of the parent nodes; and
has at least one identified candidate node nested within it.

9. The method of claim 1,
wherein the identified candidate nodes may correspond to product listings, and
wherein the assessing further comprises assessing whether the identified candidate node qualifies as a product listing based on whether the extracted information fulfills a required set of characteristics for a product listing.

10. The method of claim 1, further comprising:
generating a domain model describing each listing item identified in the content page, the domain model comprising a filterable list of attributes for each listing item, the attributes corresponding to properties and structure of a DOM representation of each listing item.

11. The method of claim 1, further comprising:
determining one or more primary listing items and one or more related listing items, the related listing items being recommended by a provider of the content page based on a perceived interest in the one or more primary listing items;

determining an association between a user of a social-networking system and one or more of the one or more primary listing items; and providing for display to the user the one or more related listing items.

12. One or more computer-readable non-transitory storage media embodying software that is operable when executed to:

extract a document object model (DOM) for a content page, wherein the DOM comprises a hierarchical tree-based data structure;

identify candidate nodes in the DOM based on a context of the identified candidate nodes, wherein the context includes identified candidate navigation elements, and wherein the identified candidate nodes may correspond to listing items;

determine whether following a URL associated with at least one of the identified candidate navigation elements results in display of different candidate nodes in a same relative position as the identified candidate nodes; and for each of the identified candidate nodes:

locate its parent and child nodes by traversing the DOM from the identified candidate node;

extract information from the identified candidate node and its parent and child nodes, wherein the extracted information comprises attributes extracted from a cascading style sheets (css) style class referenced by the identified candidate nodes;

determine whether the identified candidate node is a pivot item based on attributes extracted from the css style class that fulfill a set of characteristics for a listing item;

traverse up the DOM from the pivot item to determine whether a parent element is present in the DOM, wherein the parent element is a first parent node identified in the traversal with more than one nested pivot item; and assess whether the identified candidate node qualifies as a listing item based on whether (1) the identified candidate node is a pivot item; (2) the parent element is present in the DOM and (3) following the URL results in display of different candidate nodes in the same relative position as the identified candidate nodes.

13. The media of claim 12, wherein identifying candidate nodes comprises identifying image elements in the DOM.

14. The media of claim 12, wherein assessing whether the identified candidate node qualifies as a listing item comprises determining whether a child node for the identified candidate node comprises a nested price element.

15. The media of claim 12, wherein assessing whether the identified candidate node qualifies as a listing item comprises determining whether a child node for the identified candidate node comprises a nested buy link element.

16. The media of claim 12, further comprising:
identifying date elements in the DOM;
for each date element:

locating its parent and child nodes by traversing the DOM from the date element;

extracting information from its parent and child nodes; and assessing whether the date element qualifies as a product review based on whether the information extracted from its parent and child nodes fulfils a required set of characteristics for a product review.

17. A system comprising:

one or more processors; and a non-transitory memory coupled to the processors comprising instructions executable by the one or more processors, the one or more processors operable when executing the instructions to:

extract a document object model (DOM) for a content page, wherein the DOM comprises a hierarchical tree-based data structure;

identify candidate nodes in the DOM based on a context of the identified candidate nodes, wherein the context includes including identified candidate navigation elements, and wherein the identified candidate nodes may correspond to listing items;

determine whether following a URL associated with at least one of the identified candidate navigation elements results in display of different candidate nodes in a same relative position as the identified candidate nodes; and for each of the identified candidate nodes:

locate its parent and child nodes by traversing the DOM from the identified candidate node;

extract information from the identified candidate node and its parent and child nodes, wherein the extracted information comprises attributes extracted from a cascading style sheets (css) style class referenced by the identified candidate nodes;

determining whether the identified candidate node is a pivot item based on attributes extracted from the css style class that fulfill a set of characteristics for a listing item;

traversing up the DOM from the pivot item to determine whether a parent element is present in the DOM, wherein the parent element is a first parent node identified in the traversal with more than one nested pivot item; and assess whether the identified candidate node qualifies as a listing item based on whether (1) the identified candidate node is a pivot item; (2) the parent element is present in the DOM and (3) following the URL results in display of different candidate nodes in the same relative position as the identified candidate nodes.

18. The system of claim 17, wherein identifying candidate nodes comprises identifying image elements in the DOM.

* * * * *